March 17, 1931.  H. C. EDDY  1,796,750

DEHYDRATING APPARATUS HAVING PRELIMINARY AGGLOMERATOR

Original Filed Nov. 9, 1926

INVENTOR:
HAROLD C. EDDY
BY Ford W Lewis
ATTORNEY.

Patented Mar. 17, 1931

1,796,750

UNITED STATES PATENT OFFICE

HAROLD C. EDDY, OF LOS ANGELES, CALIFORNIA, ASSIGNOR TO PETROLEUM RECTI-
FYING COMPANY OF CALIFORNIA, OF LOS ANGELES, CALIFORNIA, A CORPORATION
OF CALIFORNIA

DEHYDRATING APPARATUS HAVING PRELIMINARY AGGLOMERATOR

Application filed November 9, 1926, Serial No. 147,231. Renewed August 11, 1930.

My invention relates to a method of and apparatus for dehydrating emulsions and particularly petroleum emulsions.

Petroleum as it is taken from the well is very often associated with water, a portion of which is usually finely divided in the petroleum and will not separate therefrom by gravity. This necessitates the emulsion being subjected to a dehydrating treatment as the petroleum is of no commercial value until the water content is reduced to about two-tenths of one per cent. Electrical dehydrators are commonly employed for this purpose in which the petroleum emulsion is subjected to the action of an electric field established between a pair of electrodes. The electric field agglomerates the water particles into masses of water having sufficient weight to settle from the petroleum. In the common form of electrical dehydrator the treating of the oil is slow if the water content is to be reduced to approximately two-tenths of one per cent. I have discovered that by first mechanically agglomerating the water particles and then subjecting the emulsion to the action of an electric field, the dehydration may be accelerated to a practical rate so that the dehydrating cost will not be excessive.

It is accordingly an object of this invention to provide a method of dehydrating emulsion which consists in mechanically agglomerating the water particles and then subjecting the emulsion to the action of an electric field.

Quite often petroleum in addition to carrying water particles carries foreign solid particles in suspension therein, these solid particles consisting of mud, silt, sand, and the like. These foreign particles when introduced into the electrical dehydrator tend to deteriorate the parts and to clog the apparatus.

Another object of the invention is to provide a method in which the foreign solid particles are removed from the emulsion before it is subjected to the action in the electrical dehydrator.

Other objects and advantages of the invention will be made evident hereinafter.

Referring to the drawing in which I illustrate my invention,

Figure 1:
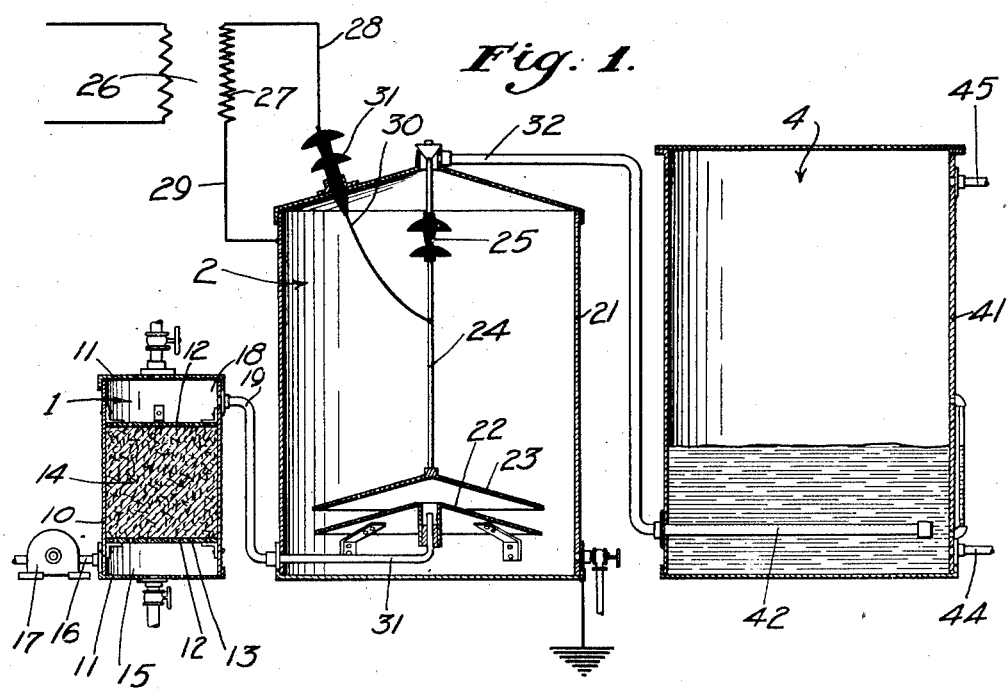
Fig. 1 is a vertical section through the apparatus, adapted for conducting the method of this invention.
Figure 2:
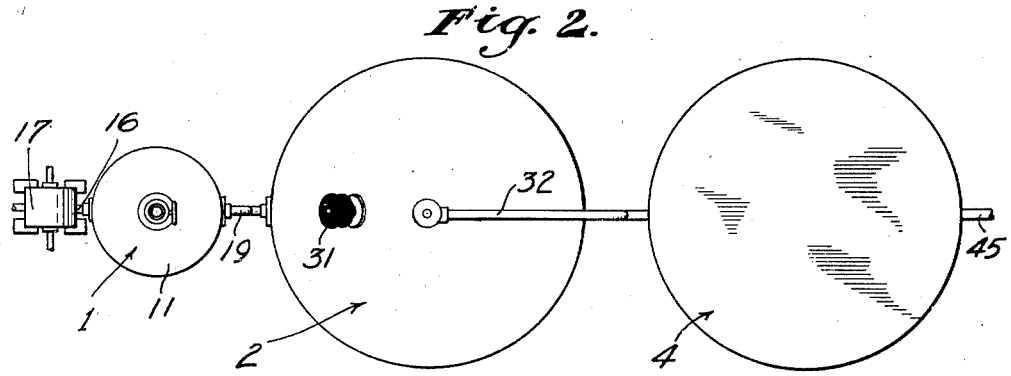
Fig. 2 is a plan view of Fig. 1.

Referring to the drawing in detail, 1 is an agglomerator, 2 is a dehydrator, and 4 is a settling tank.

The agglomerator 1 consists of a shell 10 having tight end heads 11 secured to the opposite ends of the shell. Secured between the ends heads 11 are intermediate heads 12 having perforations 13. Placed between the intermediate heads 12 is an agglomerating material 14. The agglomerating material 14 may be any agglomerating material such as excelsior, steel wool, or other substance capable of breaking the emulsion in the manner which will be described hereinafter. The emulsion is introduced into the space 15 below the lower intermediate head 12 by means of an emulsion pipe 16 having a pressure pump 17. The emulsion passes through the agglomerating material into an upper space 18 formed between the upper intermediate head 12 and the upper head 11. Any water which is separated during this passage of the emulsion through the agglomerating material drops to the lower end of the shell 10 and is removed therefrom through the drain shown in Fig. 1.

The emulsion is conveyed from this space 18 to the dehydrator 2 by means of a pipe 19. The dehydrator 2 consists of a tank 21 in which a grounded electrode 22 and a live electrode 23 are supported. The grounded electrode 22 is grounded to the tank 21, whereas the live electrode 23 is supported by a rod 24 having an insulator 25 included therein. In Fig. 1, I diagrammatically illustrate a transformer 26 having a secondary 27. One side of the secondary 27 is connected to a conductor 28 and the other side is connected to a conductor 29. The conductor 28 is connected to a wire 30 which is connected to the rod 24, this wire 30 extending through an insulating bushing 31. The conductor 29 is attached to the grounded tank 21. The electrodes 22 and 23, as will be obvious from the description, are connected in an electric circuit so that an electric field may be set up in the space therebetween. The emulsion pipe 19 is connected to a pipe 31 by means of which the emulsion is delivered to the treating space between the grounded and live electrodes 22 and 23. The treated emulsion is withdrawn from the upper end of the dehydrator 2 by means of a pipe 32.

The pipe 32 is extended to the settling tank 4. The settling tank 4 consists of a shell 41 having a spray pipe 42 therein, to which the pipe 32 is connected. The treated emulsion passes through the spray pipe 42 into the shell 41. Water is withdrawn from the shell by a pipe 44 which is connected to the lower end thereof and clean dry oil is withdrawn from the shell by means of a pipe 45 which is connected to the upper end thereof.

The operation of the invention is substantially as follows.

The pump 17 is set into operation and emulsion is delivered through the pipe 16 into the space 15 of the agglomerator 1. The emulsion is forced through the perforations 13 in the lower intermediate head 12 into the agglomerating material 14. The emulsion passes through the agglomerating material 14 into the space 18 at the upper end of the agglomerator. The action of the agglomerating material on the emulsion is to break up the film of petroleum surrounding the water particles so that the water particles may coalesce into particles of sufficient size to be easily acted upon by the electric field in the dehydrator 2. This is one function of the agglomerator. Another function is to separate the solid foreign particles from the emulsion.

The emulsion passes from the agglomerator 1 through the pipe 19 and is delivered by the pipe 31 into the treating space between the electrodes, the electric field having been re-established. The water particles are, due to the action of the agglomerator, of such a size that they are quickly acted upon by the electric field and coalesced into masses of sufficient size to settle from the oil by gravity. The emulsion passes from the treating space between the electrodes and moves upward in the tank 21, being removed therefrom by the pipe 32. The pipe 32 delivers the treated emulsion to the spray pipe 42 by means of which it is introduced to the settling tank 4 and is removed therefrom through the pipe 45, whereas the water content of the emulsion remains at the lower part of the tank 4, being removed therefrom by means of the pipe 44.

In my invention it is possible to economically dehydrate petroleum emulsion so that petroleum removed from the apparatus will have a water content which is about two-tenths of one per cent. The agglomerator 1 is an extremely important part of the invention since it conditions the petroleum so that the electric field in the dehydrator 2 will quickly coalesce the water particles into masses of sufficient size to readily gravitate from the petroleum. The fact that the agglomerator 1 also removes foreign matter from the emulsion is important from the standpoint of upkeep of the apparatus. It is well known that this foreign matter deteriorates dehydrating apparatus and requires frequent inspection or repair of the apparatus.

From the foregoing description it will be seen that my invention in its broadest scope consists of agglomerating or mechanically agglomerating the water particles of an emulsion and then subjecting the emulsion to the action of an electric field.

Although the agglomerating material 14 has been described as having the function of merely agglomerating the emulsion passing through the agglomerator 1, this material may be formed of acid-treated clays or some other chemically active substance, preferably prepared in a form which will break the emulsion and which will have a chemical effect upon the emulsion due to the nature of the material itself as well as having the agglomerating effect previously described.

I claim as my invention:

1. A process of dehydrating emulsions comprising: mechanically agglomerating the dispersed particles of the emulsion; and subjecting the emulsion to the action of an electric field.

2. A process of dehydrating emulsions comprising: mechanically agglomerating the dispersed particles of the emulsion; removing foreign solid particles from the emulsion; and subjecting the emulsion to the action of an electric field.

3. A process of dehydrating emulsions comprising: mechanically agglomerating the dispersed particles of the emulsion; removing foreign solid particles from the emulsion simultaneously with the agglomerating of the dispersed particles; and subjecting the emulsion to the action of an electric field.

4. A process of dehydrating an emulsion which includes the steps of: mechanically agglomerating the particles of the dispersed phase of the emulsion; removing any of said particles which separate due to the agglomerating step; and subjecting the emulsion after said agglomerating step to the action of an electric field.

In testimony whereof, I have hereunto set my hand at Los Angeles, California, this 4th day of November, 1926.

HAROLD C. EDDY.